United States Patent
Ronciak et al.

(10) Patent No.: US 7,404,040 B2
(45) Date of Patent: Jul. 22, 2008

(54) PACKET DATA PLACEMENT IN A PROCESSOR CACHE

(75) Inventors: John Anthony Ronciak, Beaverton, OR (US); Christopher David Leech, Portland, OR (US); Prafulla Shashikant Deuskar, Hillsboro, OR (US); Jesse C. Brandeburg, Portland, OR (US); Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 11/027,971

(22) Filed: Dec. 30, 2004

(65) Prior Publication Data

US 2006/0168400 A1    Jul. 27, 2006

(51) Int. Cl.
*G06F 12/00*    (2006.01)

(52) U.S. Cl. ...................................... 711/118
(58) Field of Classification Search ................... 711/118
See application file for complete search history.

(56) References Cited

U.S. PATENT DOCUMENTS

| | | | | |
|---|---|---|---|---|
| 5,398,245 A | * | 3/1995 | Harriman, Jr. | 370/389 |
| 6,247,060 B1 | * | 6/2001 | Boucher et al. | 709/238 |
| 6,625,689 B2 | * | 9/2003 | Narad et al. | 711/110 |
| 6,658,480 B2 | * | 12/2003 | Boucher et al. | 709/239 |
| 2001/0037397 A1 | * | 11/2001 | Boucher et al. | 709/230 |
| 2002/0073216 A1 | * | 6/2002 | Gaur | 709/230 |
| 2003/0095559 A1 | * | 5/2003 | Sano et al. | 370/419 |
| 2005/0204058 A1 | * | 9/2005 | Philbrick et al. | 709/238 |
| 2006/0064508 A1 | * | 3/2006 | Panwar et al. | 709/250 |
| 2006/0104303 A1 | * | 5/2006 | Makineni et al. | 370/463 |

OTHER PUBLICATIONS

Wikipedia, "OSI Model", [online], updated Dec. 5, 2004, [retrieved on Dec. 5, 2004], downloaded from the Internet at <URL: http://en.wikipedia.org/wiki/OSI_model>, 4 pp.

* cited by examiner

*Primary Examiner*—Matthew Kim
*Assistant Examiner*—Ryan Dare
(74) *Attorney, Agent, or Firm*—Konrad Raynes & Victor, LLP

(57) ABSTRACT

Packet data received by a network controller is parsed and at least a portion of a received packet is stored by the network controller in both a host memory of a system and also in a cache memory of the central processing unit of the system. Other embodiments are described and claimed.

24 Claims, 4 Drawing Sheets

PACKET DATA PLACEMENT IN A PROCESSOR CACHE

BACKGROUND

In a network environment, a network controller or adapter on a host computer, such as an Ethernet controller, Fibre Channel controller, etc., will receive Input/Output (I/O) requests or responses to I/O requests initiated from the host. Often, the host computer operating system includes a device driver to communicate with the network controller hardware to manage I/O requests to transmit over a network. Data packets received at the network controller are often stored in an available allocated packet buffer in the host memory. The host computer may implement a protocol to process the packets received by the network controller that are stored in the packet buffer, and access any I/O commands or data embedded in the packet.

For instance, the computer may implement the Transmission Control Protocol (TCP) and Internet Protocol (IP) to decode and extract the payload data in the TCP/IP packets received at the network adapter. IP specifies the format of packets, also called datagrams, and the addressing scheme. TCP is a higher level protocol which establishes a virtual connection between a destination and a source. Another protocol, Remote Direct Memory Access (RDMA) establishes a higher level connection and permits, among other operations, direct placement of data at a specified memory location at the destination.

In many systems, the central processing unit of the host computer may have a cache in which data may be stored in anticipation that the cached data may satisfy an upcoming processor operation. The central processing unit can frequently read data more quickly from the central processing unit cache as compared to the host memory. As a consequence, if the proper data has been cached in the central processing unit cache, processing of that data can often be facilitated.

There are a number of data caching techniques for selecting the data to be cached. Many of these techniques are based on a "hit" or "miss" strategy. If target data requested by the central processing unit is found in the central processing unit cache, a "hit" occurs which provides positive feedback to continue selecting data for caching using the current criteria. Conversely, if target data requested by the central processing unit is not found in the central processing unit cache, a "miss" occurs which provides negative feedback. Once a certain number of misses occurs, the criteria used to select data for caching may be changed in an attempt to increase the frequency of cache hits.

If processing of data is initiated with an empty cache, a significant number of cache misses may be incurred as the cache is filled. One technique for increasing cache efficiency is to "warm" the cache by placing data in the cache prior to initiating processing of the data. A cache may be warmed by placing prefetch instructions in the network controller driver. For example, a driver for the network controller may provide prefetch instructions to the central processing unit to place headers of selected packets in the central processing unit cache in anticipation of that header information being needed by the processor. However, in many systems, the central processing unit is not obligated to act on such prefetch instructions from the driver. As a consequence, significant data access latency may occur as the cache is filled as processing of the data packets is initiated.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments. It is understood that other embodiments may be utilized and structural and operational changes may be made without departing from the scope of the present description.

Figure 1:
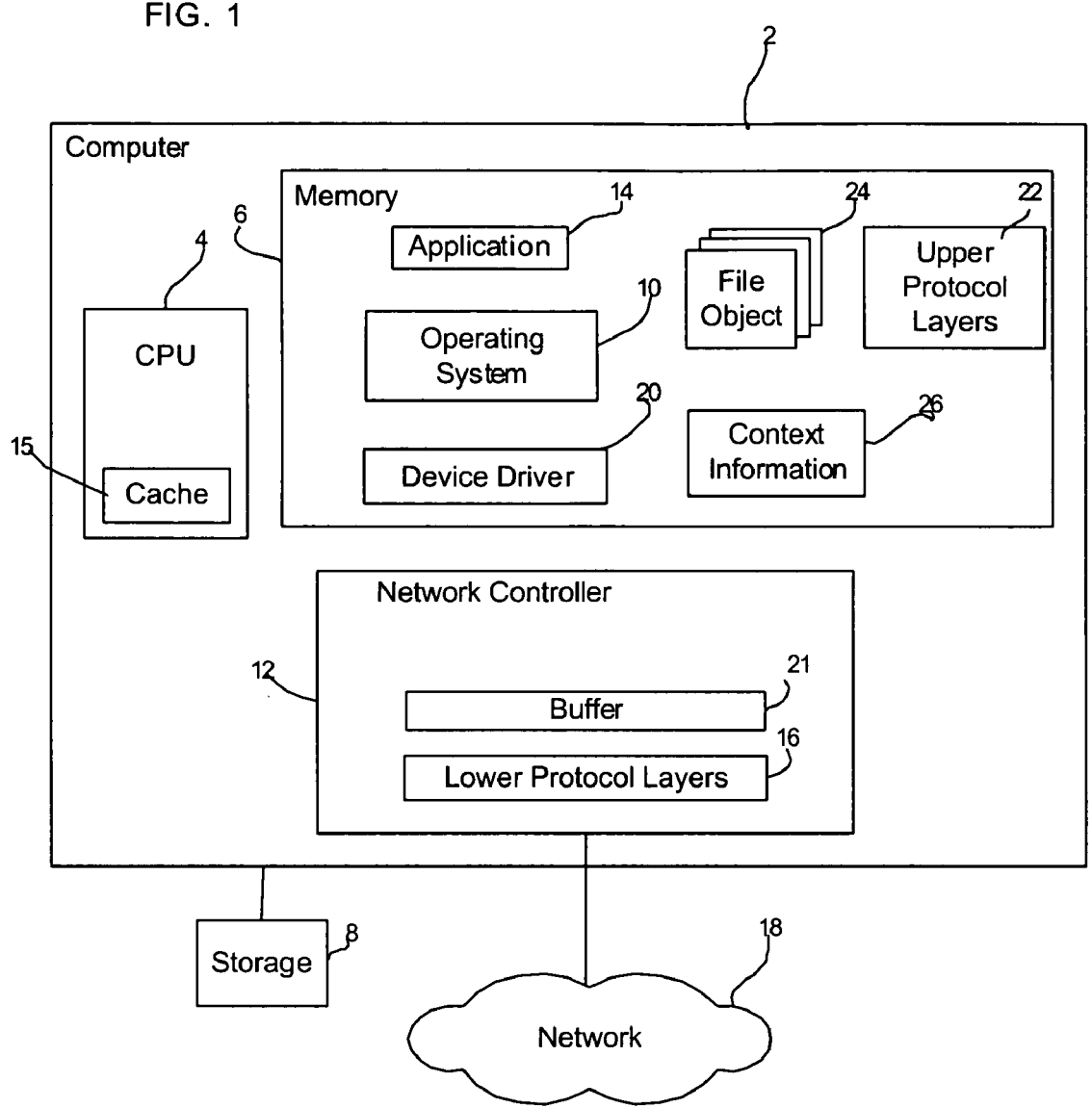
FIG. 1 illustrates one example of a computing environment in which aspects of the description provided herein may be employed.

FIG. 1 illustrates one example of a computing environment in which aspects of the description provided herein may be employed. A computer 2 includes one or more central processing units (CPU) 4 (only one is shown), a volatile host memory 6, nonvolatile storage 8, an operating system 10, and a network controller 12. An application program 14 further executes in host memory 6 and is capable of directing the transmission and reception of packets over a network 18.

The computer 2 may comprise any suitable computing device, such as a mainframe, server, personal computer, workstation, laptop, handheld computer, telephony device, network appliance, virtualization device, storage controller, network controller, etc. The CPU 4 may comprise any suitable microprocessor, controller, or logic circuit. The operating system 10 may comprise any suitable operating system. Programs and data in memory 6 may be swapped into storage 8 as part of memory management operations.

The CPU 4 has a cache 15 in which data may be stored in anticipation of that data being needed by the CPU 4 for processing. The cache 15 may be a part of the integrated circuit chip on which the CPU 4 is formed. Alternatively, the cache 15 may be one or more separate integrated circuit chips of the chipset which includes the CPU 4. Lines of data from the host memory 6 may be cached by the CPU cache 15 in accordance with various caching techniques. The architecture of the CPU 4 and cache 15 is such that, in one embodiment, it provides substantially faster access by the CPU 4 to the cache 15 as compared to access by the CPU 4 to the host memory 6. For example, a private bus may interconnect the CPU 4 and the cache 15 wherein a system bus may interconnect the CPU 4 to the host memory 6. The details of the caching architecture and technique will vary, depending upon the particular application.

The computer 2 provides a protocol stack which includes lower protocol layers 16 and upper protocol layers 22. The operations of each of the various protocol layers may be implemented in hardware, firmware, drivers, operating systems, applications or other software, in whole or in part, alone or in various combinations thereof. In the illustrated embodiment, certain lower protocol layers are implemented in hardware and firmware of the network controller 12 and certain upper protocol layers 22 are implemented by system resources such as CPU 4 and system software in the memory 6 of the computer 2.

The lower protocol layers 16 of the network controller 12 of the illustrated embodiment include a network protocol layer implementing a network protocol such as the IP protocol, for example, to send and receive network packets to and from remote devices over the network 18. The network 18 may comprise a Local Area Network (LAN), the Internet, a Wide Area Network (WAN), Storage Area Network (SAN), etc. The embodiments may be configured to transmit data over a wireless network or connection, such as wireless LAN, Bluetooth, etc.

In certain embodiments, one or more of the lower protocol layers 16 or upper protocol layers 22 may implement the Ethernet protocol (IEEE std. 802.3, published Mar. 8, 2002) over unshielded twisted pair cable, TCP/IP (Transmission Control Protocol/Internet Protocol), Remote Direct Memory Access (RDMA), token ring protocol, Fibre Channel (IETF RFC 3643, published December, 2003), Infiniband, or any other suitable networking protocol. Details on the TCP protocol are described in "Internet Engineering Task Force (IETF) Request for Comments (RFC) 793," published September, 1981, details on the IP protocol are described in "Internet Engineering Task Force (IETF) Request for Comments (RFC) 791, published September, 1981, and details on the RDMA protocol are described in the technology specification "Architectural Specifications for RDMA over TCP/IP" Version 1.0 (October, 2003).

The network controller 12 may be integrated into circuits on the motherboard carrying the CPU chipset either as part of the CPU chipset or other integrated circuits of the motherboard. The circuits of the motherboard can include various controllers including a system controller, peripheral controller, memory controller, hub controller, I/O bus controller, etc. Alternatively, the network controller 12 may comprise separate integrated circuits disposed in a separate chassis or on an expansion board which is connected to a system bus in an expansion slot.

A device driver 20 executes in memory 6 and includes network controller 12 specific commands to communicate with the network controller 12 and interface between the operating system 10, applications 14 and the network controller 12. In the illustrated embodiment, the network layer of the lower protocol layers 16 handles network communication and stores received packets in a packet buffer 21 prior to being processed by a transport layer of the upper protocol layers 22.

The lower protocol layers 16 of the illustrated embodiment further include a data link layer which includes two sublayers: a Media Access Control (MAC) layer and a Logical Link Control (LLC) layer. The MAC sublayer controls how a computer on the network gains access to the data and permission to transmit it. The LLC layer controls frame synchronization, flow control and error checking. In the illustrated embodiment, the packet buffer 21 is located in the MAC portion of the network controller. It is appreciated that the buffer 21 may be located in other portions of the network controller 12 as well as other portions of the computer 2. A physical layer of the lower protocol layers 16 includes hardware such as a data transceiver. In an embodiment employing an Ethernet protocol, the data transceiver could be an Ethernet transceiver.

A transport layer of the upper protocol layers 22 interfaces with the device driver 20, or operating system 10 or application 14 and performs various transport protocol layer operations on the received packets. The operations include sending to the packet sender acknowledgments of the receipt of packets in accordance with the appropriate protocol. In addition, the transport layer can process the content of messages included in the packets received at the network controller 12 that are wrapped in a transport layer, such as TCP and/or IP, the Internet Small Computer System Interface (iSCSI), Fibre Channel SCSI, parallel SCSI transport, or any other transport layer protocol in the art. The transport layer can unpack the payload from the received packet and transfer the data to the device driver 20, operating system 10 or application 14.

In certain implementations, the upper protocol layers 22 can further include an RDMA protocol layer as well as the transport protocol layer. Thus, an application 14 transmitting messages over an RDMA connection can transmit the message through the device driver 20 and the RDMA protocol layer of the upper protocol layers 22. The data of the message can be sent to the transport protocol layer of the layers 22 to be packaged in a TCP/IP packet. The transport protocol layer can further encrypt the packet before transmitting it over the network 18 through the lower protocol layers 16 of the network controller 12.

The upper protocol layers 22 and the lower protocol layers 16 of the protocol stack can each include additional or fewer protocol layers, depending upon the particular application. One or more layers implemented in hardware, firmware, software or any combination thereof in the lower protocol layers 16 of the network controller 12, may be implemented in hardware, firmware, software or any combination thereof in the upper protocol layers 22 of the computer 2, and vice versa.

The memory 6 further includes file objects 24, which also may be referred to as socket objects, which include information on a connection to a remote computer over the network 18. The application 14 uses the information in the file object 24 to identify the connection. The application 14 may use the file object 24 to communicate with a remote system. The file object 24 may indicate the local port or socket that will be used to communicate with a remote system, a local network (IP) address of the computer 2 in which the application 14 executes, how much data has been sent and received by the application 14, and the remote port and network address, e.g., IP address, with which the application 14 communicates. Context information 26 comprises a data structure including information the device driver 20, operating system 10 or application 14 maintains to manage requests sent to the network controller 12 as described below.

Figure 2:
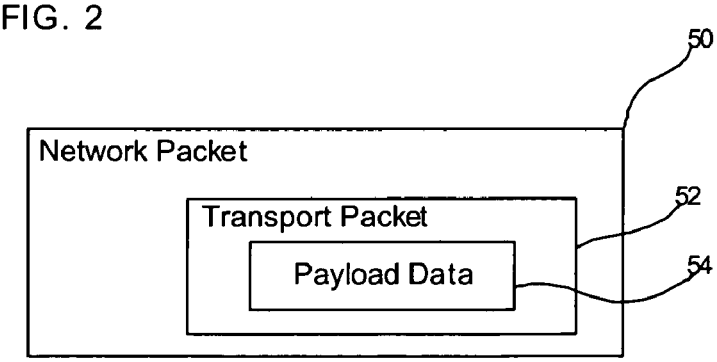
FIG. 2 illustrates a prior art packet architecture used with embodiments of the description.

FIG. 2 illustrates a format of a network packet 50 received at the network controller 12. The network packet 50 is implemented in a format understood by the network protocol layer of the lower protocol layers 16, such as the IP protocol. The network packet 150 may include an Ethernet frame that would include additional Ethernet components, such as a header and error checking code (not shown).

A transport packet 52 is included in the network packet 50. The transport packet 52 is capable of being processed by the transport layer of the host stack in accordance with a transport protocol such as the TCP protocol. The packet 52 may be processed by other layers in accordance with other protocols including Internet Small Computer System Interface (iSCSI) protocol, Fibre Channel SCSI, parallel SCSI transport, etc. The transport packet 52 includes payload data 54 as well as other transport layer fields, such as a header and an error checking code. Included in the header of each packet is the packet sequence number. The payload data 52 includes the underlying content being transmitted, e.g., commands, status and/or data. The driver 20, operating system 10 or an application 14 may include a layer, such as a SCSI driver or layer, to process the content of the payload data 54 and access any status, commands and/or data therein. The payload data 54 may include RDMA message segments or data formatted in accordance with other protocols. The RDMA message segments include RDMA headers as well as RDMA message data. Accordingly, each received packet may include one or more headers in accordance with the various protocols of the lower protocol layers 16 and the upper protocol layers 22.

Figure 3:
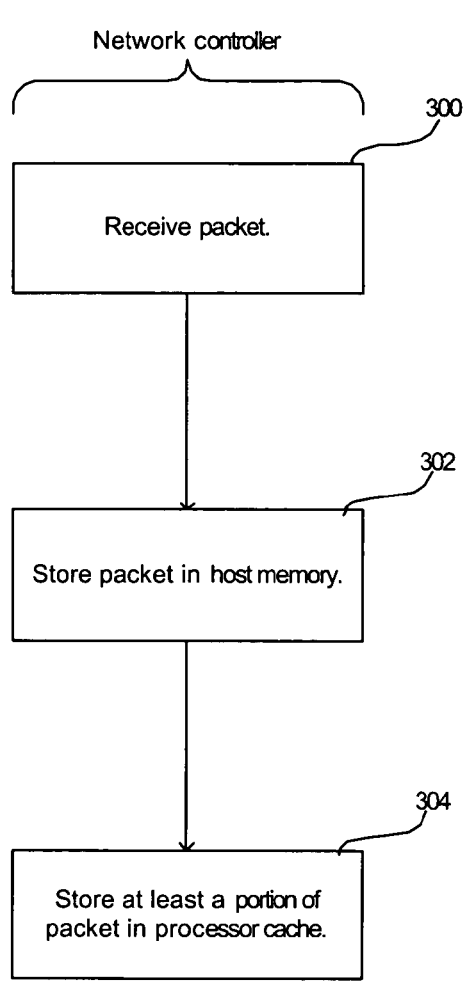
FIG. 3 illustrates one embodiment of operations to manage placement of at least a portion of a packet in a processor cache.

FIG. 3 shows operations of a network controller such as the network controller 12 which can facilitate CPU cache management. In a first operation (block 300), a packet is received from a network 18 and is stored (block 302) in a system host memory such as the memory 6. In accordance with one aspect of the description provided herein, the network controller 12 can also store (block 304) at least a portion of the received packet directly in the CPU cache 15 to warm the cache 15 for CPU processing. For example, the network controller 12 can store header portions of received packets in the CPU cache 15 in anticipation of that information being needed by the CPU 4 to process the received packets in accordance with the upper protocol layers 22 and one or more of the operating system 10, applications 14, etc.

Figure 4:
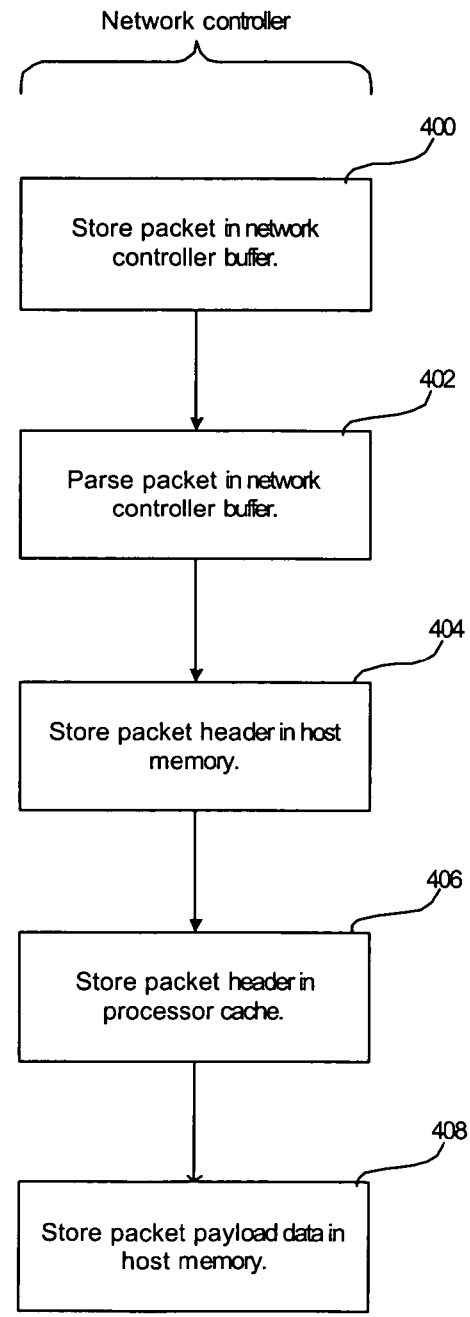
FIG. 4 illustrates another embodiment of operations to manage placement of at least a portion of a packet in a processor cache.
Figure 5:
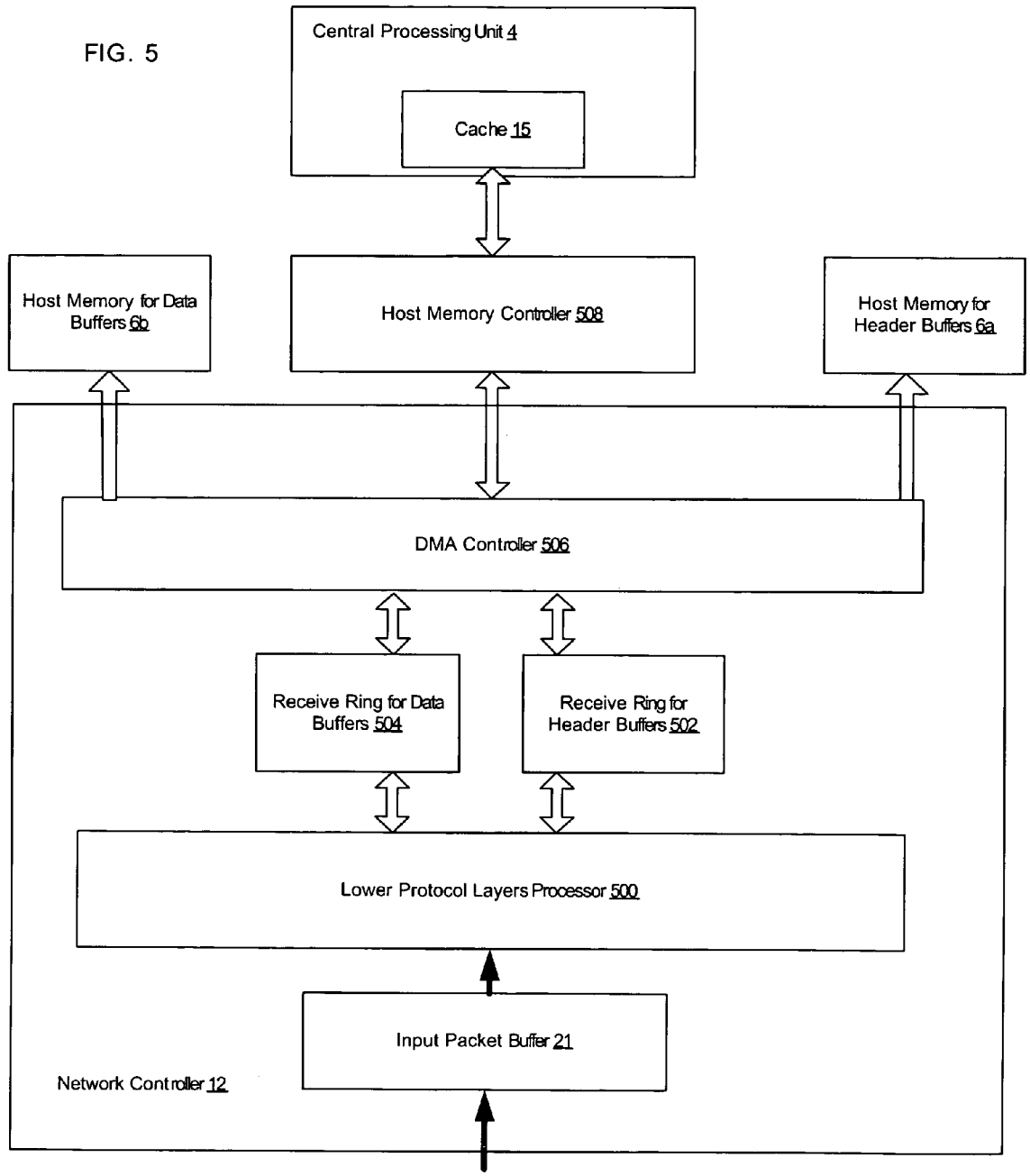
FIG. 5 illustrates another example of a computing environment in which aspects of the description provided herein may be employed.

FIG. 4 illustrates another example of operations of a network controller such as the network controller 12 which can facilitate CPU cache management. FIG. 5 is a schematic diagram illustrating portions of the network controller 12 of the illustrated embodiment in greater detail. In one operation, a packet received from the network 18 is stored (block 400) in a network controller buffer such as the input packet buffer 21. In the embodiment of FIG. 5, the operations of the lower protocol layers 16 are performed by a lower protocol processor 500 which may include hardware, software, firmware or a combination thereof. In another operation, the lower protocol processor 500 parses (block 402) a received packet to identify selected portions of the received packet. In the illustrated embodiment, the lower protocol processor 500 identifies a header portion of each received packet and stores identified header portions in a receive ring 502 for header buffers. Similarly, the lower protocol processor 500 identifies data payload portions of received packets and stores data payload portions in a receive ring 504 for data buffers. It is appreciated that the header and data payload portions of each received packet may be stored in other types of buffers as well. It is further appreciated that the network controller 12 may have fewer or greater numbers of buffers, depending upon the particular application.

In the illustrated embodiment, the lower protocol processor 500 parses the received packets for header and payload portions. These parsed headers may be TCP/IP or RDMA headers or headers of any other protocol type. Similarly, the parsed payloads may be TCP/IP or RDMA payloads or payloads of any other protocol type. It is appreciated that other packet portions may be parsed from the received packets. It is appreciated that packet portions may be parsed and separated using a variety of techniques, depending upon the particular application.

In another operation, a direct memory access (DMA) controller 506 of the network adapter 12 stores (block 404) a packet header parsed from a received packet, into a host memory, such as a portion 6a of the host memory 6. The DMA controller 506 may include hardware, software, firmware or a combination thereof. It is appreciated that in other embodiments, the host CPU 4 may transfer packet headers from the network controller 12 to the host memory 6a. This may be achieved directly or using a suitable host memory controller such as the controller 508 of the computer 2. Similarly, the DMA controller 506 of the network controller 12 may transfer packet headers from the network controller 12 to the host memory 6a directly or using a host memory controller 508 of the computer 2.

In another operation, the packet header which was stored in the host memory 6 is also stored (block 406) in the cache 15 of the CPU 4 of the computer 2. Such an operation can "warm" the CPU cache 15 to facilitate packet processing. In the illustrated embodiment, the DMA controller 506 of the network controller 12 uses the host memory controller 508 to access the CPU cache 15 and store the packet header from the receive ring for header buffers 502 to the CPU cache 15. It is appreciated that packet portions may be transferred by a network controller 12 both to a CPU cache 15 and a host memory 6a using a variety of techniques, the details of which will vary, depending upon the particular application. For example, in alternative embodiments, the DMA controller 506 of the network controller 12 may transfer packet headers from the network controller 12 to the CPU cache 15 directly or using a host memory controller 508 of the computer 2.

In the illustrated embodiment, the network controller 12 stores packet headers in the CPU cache 15. The headers stored by the network controller 12 in the CPU cache 15 may be TCP/IP or RDMA headers or headers of any other protocol type. It is appreciated that other packet portions may be stored by the network controller 12 directly into the CPU cache 15 as well as into other locations such as the host memory 6.

In another operation, the direct memory access (DMA) controller 506 of the network adapter 12 stores (block 408), a packet payload parsed from a received packet, into a host memory, such as a portion 6b of the host memory 6. It is appreciated that in other embodiments, the host CPU 4 may transfer packet payloads from the network controller 12 to the host memory 6b. This may be achieved directly or using a suitable host memory controller such as the controller 508 of the computer 2. Similarly, the DMA controller 506 of the network controller 12 may transfer packet payloads from the network controller 12 to the host memory 6 directly or using a host memory controller 508 of the computer 2.

As received packets are processed by the computer 2 in accordance with the upper protocol layers 22, the system CPU 4 reads headers of the received packets. If a targeted packet header is first found in the CPU cache 15, a cache hit occurs. It is believed that in many applications, the frequency of cache hits and hence the efficiency of cache utilization may be increased by warming the CPU cache 15 as described above. It is appreciated that other aspects of the description provided herein may be utilized, depending upon the particular application. If a targeted packet header is not found in the CPU cache 15, a cache miss occurs. The targeted packet header may then be read from the host memory 6a.

In one embodiment, warming of the CPU cache 15 may be undertaken as packets are received and prior to substantial processing of received packets by the CPU 4. In other applications, warming of the CPU cache 15 may be undertaken as appropriate, depending upon the particular application.

Additional Embodiment Details

The described techniques for processing received data in a network controller or network interface card may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium in the art.

In the described embodiments, various protocol layers and operations of those protocol layers were described. The operations of each of the various protocol layers may be implemented in hardware, firmware, drivers, operating systems, applications or other software, in whole or in part, alone or in various combinations thereof.

In certain implementations, the device driver and network controller embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. Such computer systems often include a desktop, workstation, server, mainframe, laptop, handheld computer, etc. In alternative implementations, the network controller embodiments may be included in a system that does not include a storage controller, such as certain hubs and switches.

In certain implementations, the network controller may be configured to transmit data across a cable connected to a port on the network adapter. Alternatively, the network controller embodiments may be configured to transmit data over a wireless network or connection, such as wireless LAN, Bluetooth, etc.

The illustrated logic of FIGS. 3 and 4 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In certain implementations, the buffer 21 used by the network controller 12 was described as being separate from the host memory 6 and being physically located in the network controller 12. In other embodiments, the buffer 21 may be a part of he host memory 6 or a part of other controller circuits on a separate card or on a motherboard.

Figure 6:
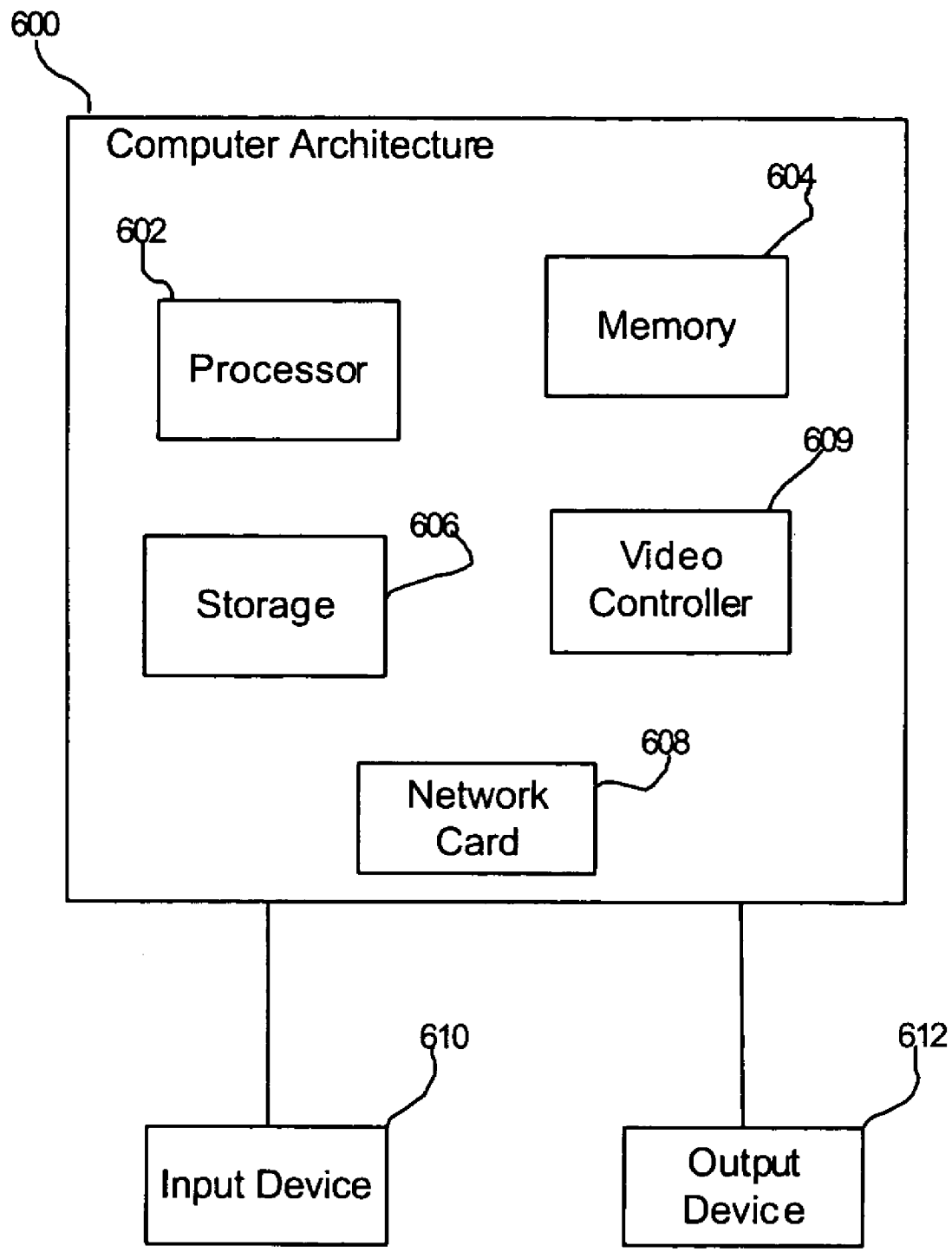
FIG. 6 illustrates an architecture that may be used with one or more described embodiments.

FIG. 6 illustrates one implementation of a computer architecture 600 of the network components, such as the hosts and storage devices shown in FIG. 1. The architecture 600 may include a processor 602 (e.g., a microprocessor), a memory 604 (e.g., a volatile memory device), and storage 606 (e.g., a nonvolatile storage, such as magnetic disk drives, optical disk drives, a tape drive, etc.). The storage 606 may comprise an internal storage device or an attached or network accessible storage. Programs in the storage 606 are loaded into the memory 604 and executed by the processor 602 in a suitable manner. The architecture further includes a network card 608 to enable communication with a network, such as an Ethernet, a Fibre Channel Arbitrated Loop, etc. Further, the architecture may, in certain embodiments, include a video controller 609 to render information on a display monitor, where the video controller 609 may be implemented on a video card or integrated on integrated circuit components mounted on the motherboard. As discussed, certain of the network devices may have multiple network cards. An input device 610 is used to provide user input to the processor 602, and may include a keyboard, mouse, pen-stylus, microphone, touch sensitive display screen, or any other suitable activation or input mechanism. An output device 612 is capable of rendering information transmitted from the processor 602, or other component, such as a display monitor, printer, storage, etc.

The network controller 12, 608 may be implemented on a network card, such as a Peripheral Component Interconnect (PCI) card or some other I/O card, or on integrated circuit components mounted on the motherboard. Details on the PCI architecture are described in "PCI Local Bus, Rev. 2.3", published by the PCI-SIG.

The foregoing description of various embodiments has been presented for the purposes of illustration and description. It is not intended to be exhaustive or to limit to the precise form disclosed. Many modifications and variations are possible in light of the above teaching.

What is claimed is:

1. A method, comprising:
a protocol layer processor of a network controller in a system performing:
receiving a packet from a network;
storing said packet in a memory of said network controller;
parsing said packet in said network controller memory to identify at least a header portion of said packet; and
transferring said packet header portion substantially without packet payload data from said network controller memory to a header buffer of said network controller; and
a direct memory access controller of said network controller performing:
storing at least a portion of said packet in a memory of said system; and
storing in a central processing unit cache, said packet header portion from said header buffer.

2. The method of claim 1 wherein said central processing unit cache storing includes said direct memory access controller of said network controller transferring said packet header portion to said central processing unit cache using a memory controller of said system.

3. The method of claim 1 wherein said header buffer includes a receive ring.

4. The method of claim 3 wherein said network controller memory is a network controller buffer and wherein said method further comprises transferring payload data of said packet from said network controller buffer to a payload data buffer.

5. The method of claim 4 wherein said data buffer is a receive ring.

6. The method of claim 4 wherein said central processing unit cache storing includes said direct memory access controller transferring said packet header portion from said network controller header buffer to a header buffer of said memory of said system and said memory controller of said system transferring said packet header portion from said header buffer of said system to said central processing unit cache.

7. A network controller for use with a network and in a system having a memory and a central processing unit having a cache, comprising:
a header buffer adapted to store packet header portions, a direct memory access controller, a memory and a protocol layer processor adapted to:
receive a packet from a network;
store said packet in said memory of said network controller;
parse said packet in said network controller memory to identify at least a header portion of said packet; and
transfer said packet header portion substantially without packet payload data from said network controller memory to said header buffer of said network controller;
wherein said direct memory access controller of said network controller is adapted to:
store at least a portion of said packet in said system memory; and
store in said central processing unit cache, said packet header portion from said header buffer.

8. The network controller of claim 7 wherein said system has a memory controller and wherein said central processing unit cache storing by said direct memory access controller includes said direct memory access controller being adapted to transfer said packet header portion to said central processing unit cache using said system memory controller.

9. The network controller of claim 8 wherein said header buffer includes a receive ring.

10. The network controller of claim 9 wherein said network controller further includes a data buffer and wherein said network controller memory is a network controller buffer and wherein said protocol layer processor is further adapted to transfer payload data of said packet from said network controller buffer to said data buffer.

11. The network controller of claim 10 wherein said data buffer is a receive ring.

12. The network controller of claim 8 wherein said system memory includes a header buffer and wherein said system memory storing includes said direct memory access controller transferring said packet header portion from said network controller header buffer to said header buffer of said memory of said system.

13. A system, comprising:
a motherboard;
a memory;
a central processing unit having a cache and carried on said motherboard; and
a network controller carried on said motherboard and having a header buffer adapted to store packet header portions, a direct memory access controller, a memory and a protocol layer processor adapted to:
receive a packet from a network;
store said packet in said memory of said network controller;
parse said packet in said network controller memory to identify at least a header portion of said packet; and
transfer said packet header portion substantially without packet payload data from said network controller memory to said header buffer of said network controller;
wherein said direct memory access controller of said network controller is adapted to:
store at least a portion of said packet in said system memory; and
store in said central processing unit cache, said packet header portion from said header buffer.

14. The system of claim 13 further comprising a memory controller and wherein said central processing unit cache storing by said direct memory access controller includes said direct memory access controller being adapted to transfer said packet header portion to said central processing unit cache using said system memory controller.

15. The system of claim 14 wherein said header buffer includes a receive ring.

16. The system of claim 15 wherein said network controller further includes a data buffer and wherein said network controller memory is a network controller buffer and wherein said protocol layer processor is further adapted to transfer payload data of said packet from said network controller buffer to said data buffer.

17. The system of claim 16 wherein said data buffer is a receive ring.

18. The system of claim 17 wherein said system memory includes a header buffer and wherein said system memory storing includes said direct memory access controller transferring said packet header portion from said network controller header buffer to said header buffer of said memory of said system.

19. An article for use with a network and in a system having a system memory, a central processing unit having a cache, and a network controller having a memory, a direct memory access controller, and a protocol layer processor, said article comprising a hardware storage medium, the storage medium comprising machine readable instructions stored thereon to cause said protocol layer processor of said network controller to:
receive a packet from a network;
store said packet in said network controller memory;
parse said packet in said network controller memory to identify at least a header portion of said packet; and
transfer said packet header portion substantially without packet payload data from said network controller memory to a header buffer of said network controller; and
to cause said direct memory access controller of said network controller to:
store at least a portion of said packet in said system memory; and
store in said central processing unit cache, said packet header portion from said header buffer.

20. The article of claim 19 wherein said system further comprises a memory controller and wherein said central processing unit cache storing by said direct memory access controller includes said direct memory access controller transferring said packet header portion to said central processing unit cache using said system memory controller.

21. The article of claim 20 wherein said header buffer is a receive ring.

22. The article of claim 21 wherein said network controller further includes a data buffer and wherein said network controller memory is a network controller buffer and wherein the storage medium further comprises machine readable instructions stored thereon to cause said protocol layer processor to transfer payload data of said packet from said network controller buffer to said data buffer.

23. The article of claim 22 wherein said data buffer is a receive ring.

24. The article of claim 23 wherein said system memory includes a header buffer and wherein said system memory storing includes said direct memory access controller transferring said packet header portion from said network controller header buffer to said header buffer of said memory of said system.

* * * * *

UNITED STATES PATENT AND TRADEMARK OFFICE
CERTIFICATE OF CORRECTION

PATENT NO. : 7,404,040 B2
APPLICATION NO. : 11/027971
DATED : July 22, 2008
INVENTOR(S) : Ronciak et al.

It is certified that error appears in the above-identified patent and that said Letters Patent is hereby corrected as shown below:

In The Claims

Claim 18, Column 10, Line 17, "claim 17 wherein" should read --claim 16 wherein--.

Claim 24, Column 10, Line 60, "claim 23 wherein" should read --claim 22 wherein--.

Signed and Sealed this
Twenty-seventh Day of October, 2015

Michelle K. Lee
*Director of the United States Patent and Trademark Office*